United States Patent [19]

Self et al.

[11] 3,718,346
[45] Feb. 27, 1973

[54] TRUCK COMPRISING TRACTOR AND SEMI-TRAILER

[75] Inventors: Kenneth W. Self, Norman B. Chew, both of Lake Oswego, Oreg.; Bill I. Twyman, Vancouver, Wash.

[73] Assignee: Freightliner Corporation, Portland, Oreg.

[22] Filed: Aug. 27, 1970

[21] Appl. No.: 67,398

[52] U.S. Cl. ........... 280/415 B, 280/407, 280/423 R, 280/150.5, 280/124 F, 280/DIG. 1, 180/14 R, 280/408
[51] Int. Cl. ............................................ B62d 53/00
[58] Field of Search ...280/423 R, 415 B, 405 A, 407, 280/124 F; 180/12, 89

[56] References Cited

UNITED STATES PATENTS

| 3,104,679 | 8/1963 | Gouirand | 280/124 F X |
| 3,105,703 | 10/1963 | Rittenhouse | 280/423 R X |
| 3,237,966 | 3/1966 | Ayers | 280/423 R X |
| 3,411,600 | 11/1968 | Loving et al. | 180/12 X |
| 3,542,414 | 11/1970 | Nelson | 280/423 R X |
| 3,586,119 | 6/1971 | Chuchua et al. | 180/12 X |

FOREIGN PATENTS OR APPLICATIONS

| 1,027,996 | 4/1958 | Germany | 280/405 A |

*Primary Examiner*—Leo Friaglia
*Attorney*—Buckhorn, Blore, Klarquist and Sparkman

[57] ABSTRACT

A vehicular assembly comprising a tractor and a semitrailer so detachably coupled together that they act as a unit, wherein the assembly has three zones of support, one of which is provided by a zero rate suspension means and the other two of which are provided by variable rate suspension means, whereby to maintain reasonably constant a desired pattern of load distribution between the three zones.

11 Claims, 10 Drawing Figures

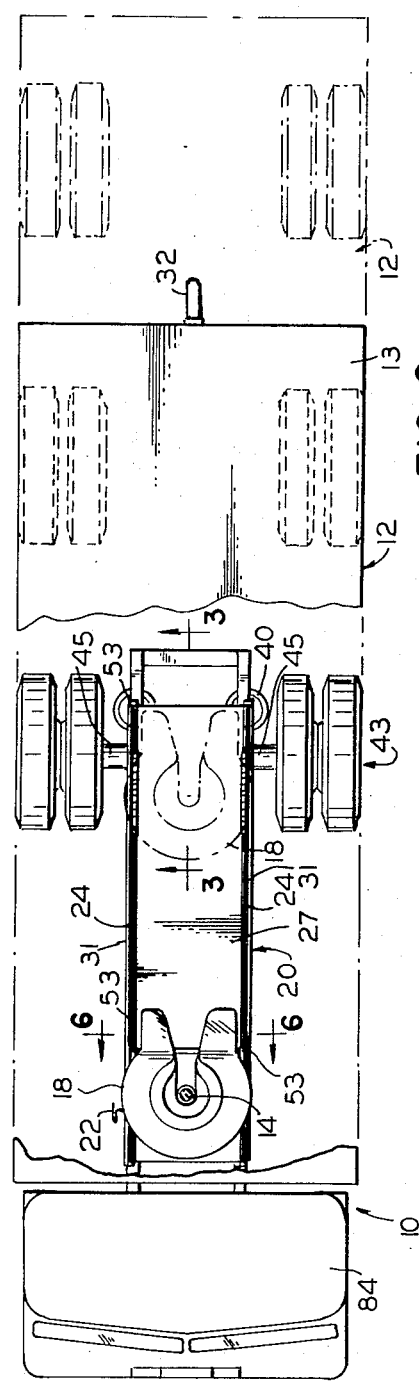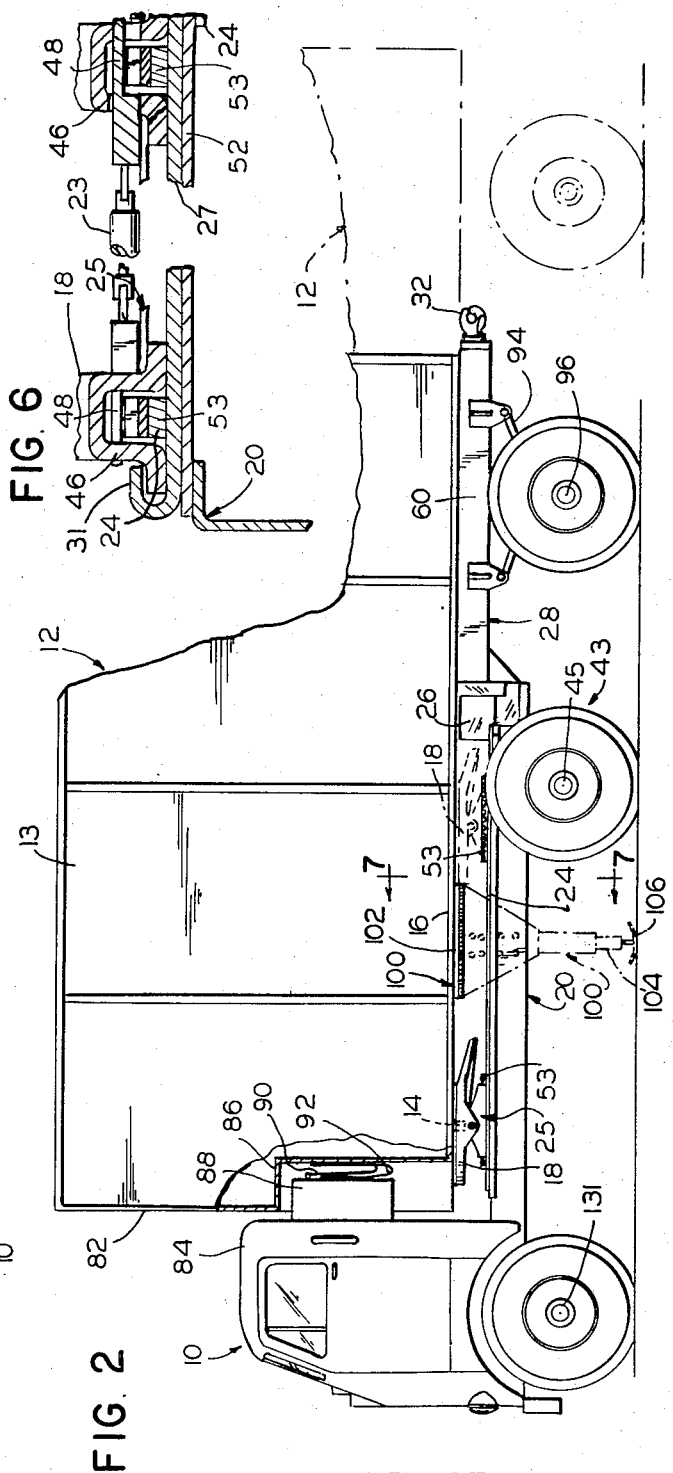

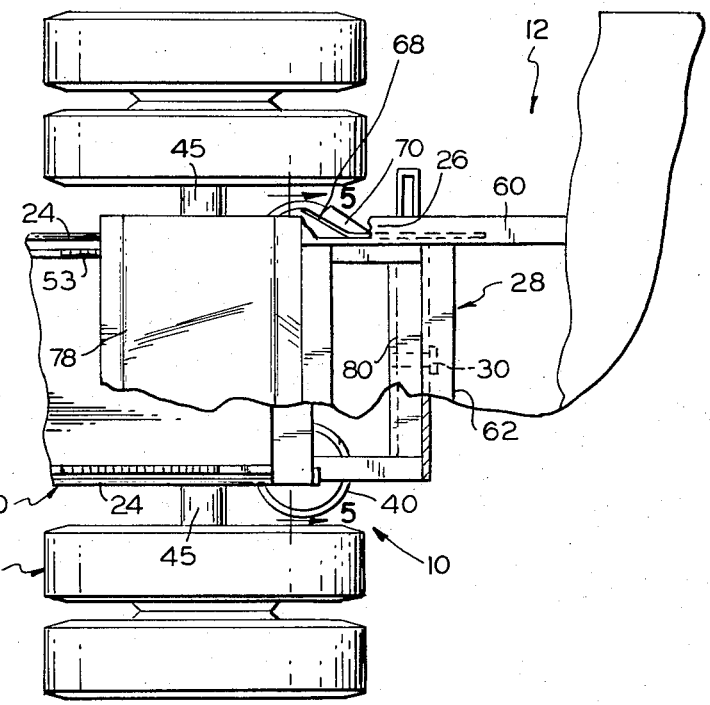
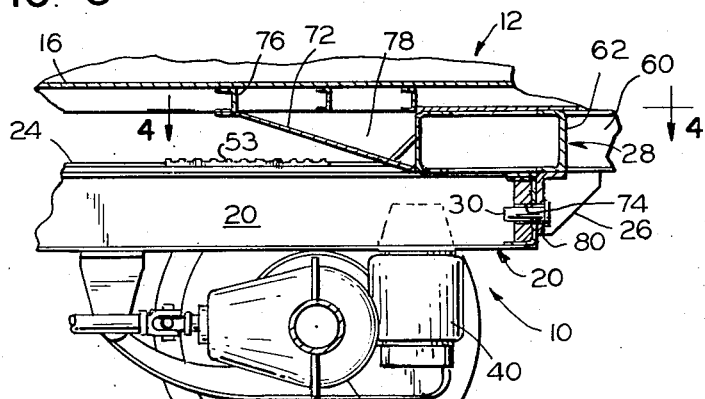
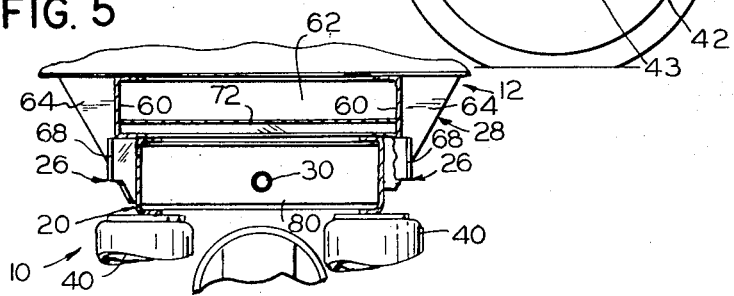

TRUCK COMPRISING TRACTOR AND SEMI-TRAILER

DESCRIPTION

This invention relates to a truck comprising a tractor and semitrailer, and more particularly to improved structure for rigidly locking together a tractor and a semitrailer.

An object of the invention is to provide a truck separable into a tractor and semitrailer.

Another object of the invention is to provide new and improved structure for rigidly locking together a tractor and a trailer.

A further object of the invention is to provide a tractor having a fifth wheel which is slidable between a rear, coupling position and a forward, running position and a frame serving as a guideway for a guide on a trailer frame and having a horizontal alignment socket therein adapted to receive a pin on the trailer frame.

Another object of the invention is to provide a trailer having a frame provided with a fixed kingpin adapted to be secured to a fifth wheel slidable on a tractor between a rear, coupling position and a forward, running position and the trailer frame also being provided with guides adapted to bracket the tractor frame to maintain horizontal alignment between the tractor and trailer frames.

Another object of the invention is to provide a combination in which a trailer frame attachable to a trailer body has a fixed kingpin, a pair of fixed vertically depending guides and a fixed locking pin.

Another object of the invention is to provide a tractor and a trailer which can be locked rigidly together and in which the only movable parts of the structure locking the tractor and the trailer together is a movable fifth wheel on the tractor.

Another object of the invention is to provide a tractor and a trailer locked together to form a truck and adapted to adjustably distribute loads over the several axles of the truck.

Another object of the invention is to provide a tractor adapted to couple hingedly to a trailer structure for operating therewith in a trailer mode of operation and, alternately, to lock to the trailer at points near the forward end of a container of the trailer and near the rear end of the container for operating therewith in a truck mode of operation.

A further object of the invention is to provide a tractor having a drive axle supporting a pair of air springs, self-levelers and control means selectively operable to connect the self-levelers to the air springs for a trailer mode of operation and to cut out the air springs to provide a floating drive axle for a truck mode of operation.

Another object of the invention is to provide a tractor having a frame, front coupler means and a guideway extending along the frame for guiding a coupler means on a trailer along the guideway to the front coupler means.

Another object of the invention is to provide a tractor-trailer combination having on the tractor front steerable wheeled axle means and a rear wheeled drive axle and also having on the trailer a wheeled trailer axle spaced from the drive axle a distance relative to the distance between the front axle means and the drive axle means such that optimum steering and load distribution are provided.

Another object of the invention is to provide a trailer structure having hinged landing gear legs adapted to at least partially fold up into a recess in the bottom of a container to provide clearance for wheels of a tractor when the trailer structure is secured to the tractor to form a truck therewith and in a position in which the legs are positioned over the wheels of the tractor.

Another object of the invention is to provide a trailer structure having clip-on trailer suspension means detachably connected to the rear end portion of a container, clip-on landing gear detachably connected to the central portion of the container and clip-on front coupler means detachably connected to the front end portion of the container, the trailer suspension means being provided with a socket for receiving and interlocking with the rear end portion of a tractor frame.

In the drawings:

FIG. 1 is a top plan view of an improved truck combination forming one embodiment of the invention;

FIG. 2 is a side elevation view of the truck combination of FIG. 1;

FIG. 3 is an enlarged, vertical sectional view taken along line 3—3 of FIG. 1;

FIG. 4 is an enlarged, horizontal sectional view taken along line 4—4 of FIG. 3;

FIG. 5 is an enlarged, vertical sectional view taken along line 5—5 of FIG. 4;

FIG. 6 is an enlarged vertical sectional view taken along line 6—6 of FIG. 1;

Figure 7:
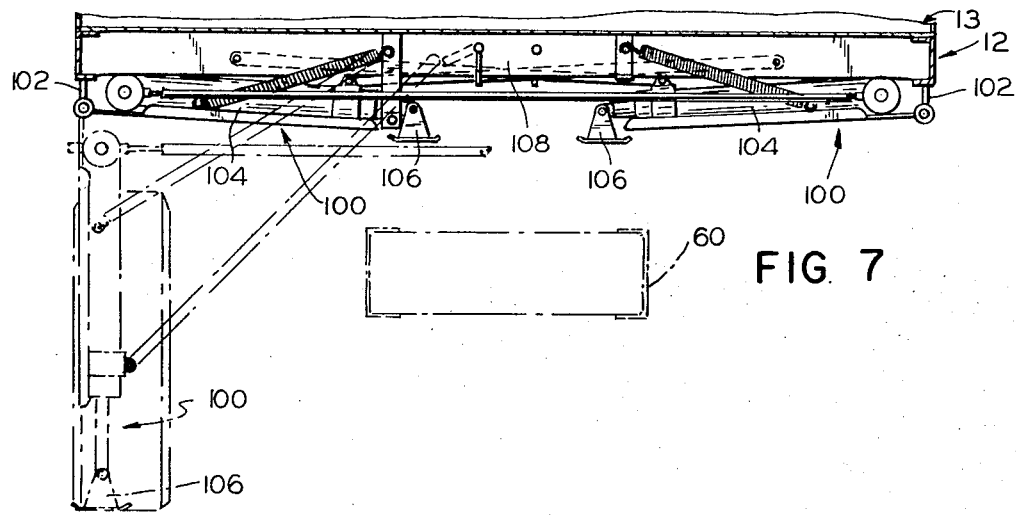
FIG. 7 is an enlarged fragmentary, vertical sectional view taken along line 7—7 of FIG. 2.

Referring now in detail to the drawings, there is shown therein an improved truck combination forming one embodiment of the invention and including a tractor 10 and semi-trailer 12 having a container of body 13. The trailer has a kingpin 14 rigidly secured in a fixed position to the forward end of a conventional bottom frame 16 of the trailer and is adapted to be connected to a fifth wheel 18 of the tractor when the fifth wheel is in its rear position on tractor frame 20, as shown in broken lines in FIGS. 1 and 2. A releasable latch 22 is provided for securing the kingpin to the fifth wheel in the usual manner.

With the trailer so connected to the fifth wheel, a truck-trailer combination can be used as a semi with the trailer articulated to the tractor. Alternately, when desired, with the trailer and tractor so coupled together, latch actuator 23 (FIG. 6) is actuated to release a slide 25, the tractor is backed up to slide a fifth wheel mounting base or slide 25 relatively forwardly along parallel, longitudinal guide portions 24 on a supporting plate 27 fixed to the tractor frame to the forward position of the fifth wheel which is shown in full lines in FIGS. 1 and 2, the plate 27 having hold down rails 31. As the tractor is so backed up, the tractor frame 20 moves in between side guides 26 of an adapter frame or socket device 28 of the trailer and over a locking pin or retainer 30 (FIGS. 3 and 4) on the frame 28. The trailer and tractor now are locked rigidly together and can be used as a fixed body truck. The trailer also is provided with a coupling 32 (FIGS. 1 and 2) for coupling to another, also full lengthed trailer (not shown) which may be either conventional or like the trailer 12 for operation as a fixed body truck with the second full lengthed trailer coupled thereto.

The tractor frame 20 is a rigid, generally boxlike frame supported by known air suspension bags 40 (FIGS. 3 and 5) carried by known rear axle suspension structure 42 suspending a conventional wheeled rear drive and axle construction 43 having a drive axle 45. The fifth wheel 18 is mounted on the base 25 (FIG. 6) which has slide members 46 slidable along the guide portions 24. The slide members 46 carry locking dogs 48 of the latch 23. The dogs 48 are selectively actuated to lock the slide to rear tooth segments 53 (FIG. 1) fixed to the rear portion of the guideway 27 (FIG. 6) of the tractor frame 20. The latch 23 may be selectively actuated from cab 84 of the tractor to release the slide 25 from the rear ones of the segments 53 to permit the slide to be slid from its rear position to its forward position. The latch 23 then is actuated to lock the dogs 48 to front toothed segments 53 to rigidly lock the slide in its forward position. Stop members (not shown) are provided on the guideway 27 to limit the sliding movement of the slide to between the rear and the forward positions thereof. The toothed segments lock the fifth wheel either in its rear position, for instance, about 8 percent of the length of the tractor wheelbase ahead of the drive axle 43 for standard trailer operation, or ahead of the driving axle, for instance, about 65 percent of the length of the tractor wheelbase, for integral truck mode of operation.

The adapter frame 28 includes longitudinal members 60 (FIGS. 2 and 3) welded to the trailer frame or bed 16, a tubular box section 62 and channel-like gussets 64 (FIG. 5) which are welded to the members 60, the plate-like side guides 26 and to the bed 16. Outwardly and forwardly inclined entrance wings 68 (FIG. 5) of the guides 26 and welded to the bottoms of the members 60 are reinforced by gussets 70 (FIG. 4) welded to the wings 68 and the rear portion side guides 26. Upwardly and forwardly inclined guide ramp 72 (FIG. 3) is adapted to slide up over the end of the tractor frame 20 to vertically align the pin 30 with bore or socket 74 in the tractor frame 20. The ramp 72 is bolted to stringer 76 of the trailer frame 16 and gussets 78 are welded to the frame 16, the ramp 72 and the box section 62. The pin 30 is in a horizontal position and is welded to a transverse angle member 80 welded at its ends to the members 60 and to the bottom of box section 62.

Front wall 82 (FIGS. 1 and 2) of the container portion 13 fits up close to the back of a cab 84 of the tractor and has a recess 86 therein providing clearance for equipment 88 often mounted on the back of the cab. Suitable electrical cords 90 and air hoses 92 are of lengths sufficient to reach connectors on the trailer when the trailer is in its rear position. The cables and hoses are retracted by a spring (not shown) within the recess 86 when the trailer is moved to its forward position. A conventional steel spring trailer suspension 94 is mounted on the adapter frame 28 of the trailer, and is supported by wheeled trailer axle 96.

The tractor 10 and the trailer 12 can be used in a trailer mode of operation together with the fifth wheel 18 in its rear position. With the fifth wheel in its forward position and the adapter frame 28 of the trailer interlocked with the tractor frame 20, the tractor and trailer can be used as in integral truck-trailer combination. Often, in fleet operations, there are several trailers 12 for one tractor 10 to form an operating group and, since each trailer 12 is not appreciably more expensive to construct than a conventional trailer, cost is minimized. Each trailer 12 can be used with conventional tractors and each tractor 10 can be used with conventional trailers. Also, another conventional trailer can be hooked onto the trailer 12 for operation of the tractor 10 and trailer 12 as an integral truck with the conventional trailer or as a two-trailer set up. Thus, great flexibility in the use of the truck-trailer combination is afforded. In the integral truck mode of operation, the container 13 is supported by a three point or zone suspension, the front point being the fifth wheel 18, the intermediate point being the box section 62 and the rear point being the trailer suspension 94.

In-and-out folding landing gear 100 (FIGS. 2 and 7) includes two long piano hinges 102, which are rigidly secured to the side rails or sills of the bed of the container portion 13, and also includes known extensible braced legs 104 having feet 106. The hinges 102 mount the legs in positions slightly offset from each other and in which the legs, when in their folded positions, move into recesses between stringers 108 of the container portion 13. This recessing of the legs into the recesses in the bottom of the container portion provides clearance for the legs to move over the wheels of the drive axle 45.

Figure 8:
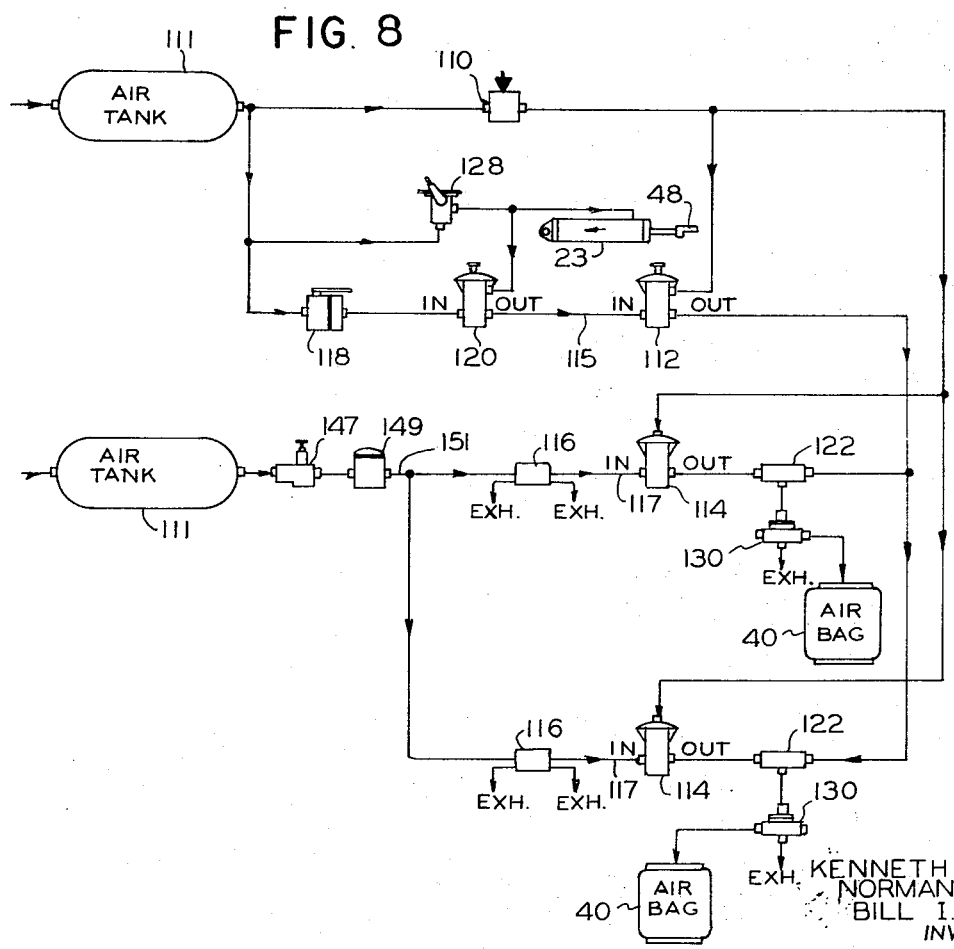
FIG. 8 is a diagrammatic view of an air suspension system of the truck combination of FIG. 1.

The air bags 40 (FIGS. 1, 2 and 8) for the integral truck or close-coupled mode of operation (with the fifth wheel 18 in its forward position) are cut off from both air intake and air exhaust so that they provide a floating axle suspension from the drive axle 45 to the rear end portion of the tractor frame 20. By "floating" as applied to the suspension, it is meant a long throw zero or very low rate spring action providing a nearly constant support to the box section 62. For the integral truck mode of operation, it is necessary that one of the three suspensions be floating, the drive axle being floated in the embodiment disclosed herein. For semitrailer operation of the tractor 10 with the trailer 12 or a conventional trailer with the fifth wheel in its rear position, known self-leveling valves 116 are connected to the air bags and control their pressures. When the fifth wheel is in its rear position, the slide 25 is in a position actuating a normally closed position or limit valve 110 on the tractor frame 20 to its open position. Air under pressure from a source 111 of air under pressure on the tractor then is supplied to a normally open valve 112 and to normally closed valves 114. This actuates the valve 112 to close off air from a line 115, and actuates the valves 114 to open lines 117 of air under pressure from the self-leveling valves 116. This actuates shuttle valves 122 to close ports from the valve 112 and to open ports of the valves 122 from the valves 114, and air under pressure from the valves 116 flows through the valves 122 and through valves 130 to the air bags 40. The air bags then are controlled by the self-leveling valves 116.

Just before the tractor 10 is backed up to move the fifth wheel 18 to its forward or close-coupled position, a valve 128 in the cab of the tractor is actuated manually to actuate the actuator 23 to unlatch the fifth wheel slide 25. The tractor then is so backed up, and this releases the switch 110 which closes. This opens the valves 112 and 122 and closes the valves 114 to cut out the self-leveling valves 116. The actuation of the valve 128 in the cab of the tractor also actuates the valve 120 to open the air bags 40 to exhaust. Then, when the fifth wheel reaches its forward or close-coupled position, the driver moves the valve 128 to its open position to cause the actuator 23 to lock the fifth wheel slide 25 in its forward position and to actuate the valve 120 to close off exhaust from the air bags 40 and connect the air bags to a manually adjustable pressure reducing valve 118, which connects the air bags to the source 111 and supplies the air bags with fixed quantities of air, which quantities can be varied by manual adjustment of the valve 118 which is in the cab of the tractor for convenient adjustment by the driver. The driver adjusts the valve 118 to place the desired distribution of load between front axle 131, which forms a part of a conventional front axle suspension, the trailer axle 96 and the axle 45, which is the floating axle, to maintain all the wheels on the ground with substantially constant pressure regardless of unevenness of terrain. A protection valve 147 and a reducing valve 149 are provided in line 151. To provide optimum load distribution while also providing good steering responsiveness, it has been found that the distance between the axles 45 and 96 should not be much less than 31 percent and not much over 41 percent of the distance between the axles 96 and 131, an optimum distance between the axles 45 and 96 being about 36 percent of the overall distance between the axles 96 and 131. To aid in turning and provide desired clearance, the side guides may be spaced outwardly somewhat from the tractor frame 20 to permit a slight swinging of the trailer on the kingpin, a total clearance of both sides of about one-quarter of an inch having been provided in one constructed embodiment.

EMBODIMENT OF FIGS. 9 AND 10

Figure 9:
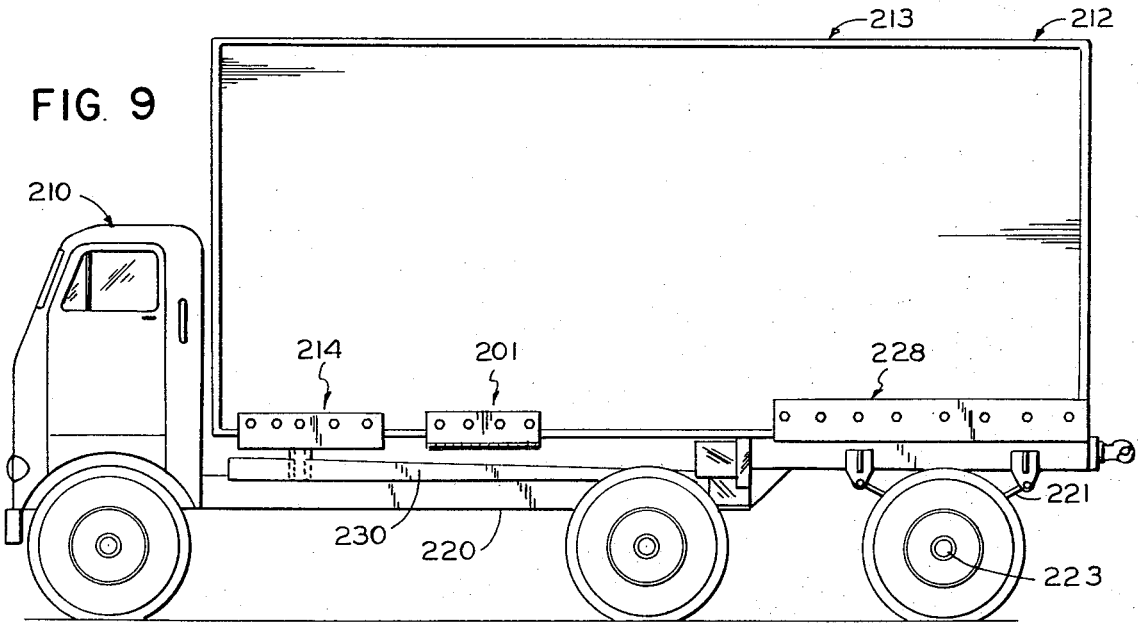
FIG. 9 is a side elevation view of a truck combination forming an alternate embodiment of the invention.
Figure 10:
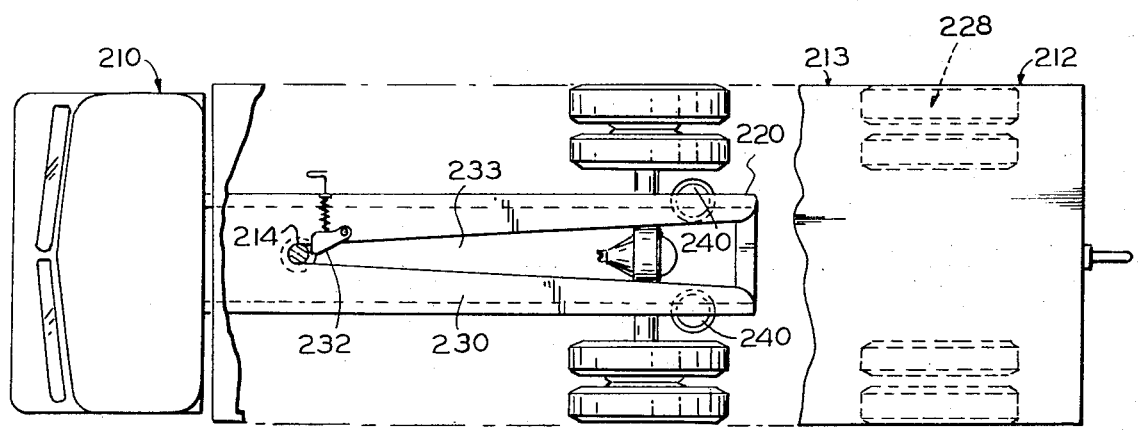
FIG. 10 is a fragmentary horizontal sectional view of the truck combination of FIG. 9.

A truck combination forming an alternate embodiment of the invention shown in FIGS. 9 and 10 includes a tractor 210 and a trailer 212. The trailer 212 is like the trailer 12 but has a container 213 of the type carried by cargo ships, and the container has detachably secured thereto a clip-on kingpin or coupling device 214, a slip-on trailer frame 228 and a clip-on landing gear 201, all of which are mounted for quick attachment to and detachment from the container 213. The trailer frame 228 is supported by a wheeled spring suspension 221 including a wheeled rear axle 223. The tractor 210 is like the tractor 10 except that the tractor 210 has no movable fifth wheel structure and instead has a fixed, slotted guideway 230 mounted on frame 220 thereof and has a coupler or lock 232 mounted at the front end of slot 233 in the guideway 230. The tractor 210 has air bags 240 like the air bags 40, the quantities of air in which are adjustably set initially to provide the floating axle suspension and to effect the desired load distribution. To couple the trailer to the tractor, the tractor is backed up with the pin 214 in the slot 233 to slide the guideway 230 along the pin 214. When the close coupled position is reached, the coupler 232 is actuated to lock to the pin 214 and socket structure of the trailer frame 228 like that of the adapter frame 28 moves over and interlocks with the tractor frame. The pin 214, as shown, is rigidly fixed to the container but could be foldable into the recess in the bottom of the container if desired. If desired, a fifth wheel could be provided in a fixed location at the rear end of the tractor frame to permit semitrailer operation.

In an alternate form of construction of the truck combination of FIGS. 9 and 10, instead of having the rear drive axle of the tractor 210 floating, the air bags 240 are omitted from the tractor 210 and are substituted in the trailer for the spring suspension 221 between the frame 228 and the wheeled rear axle 223. The drive axle has a standard spring suspension and the floating axle is the axle 223, which is adjusted to provide the desired load distribution over the three axles. Air to the air bags on the trailer are connected to lines from controls and air source on the tractor by quick disconnect connectors mounted on the trailer frame and the tractor frame in aligned positions such as to automatically connect together when the tractor and trailer are in their close-coupled condition, and to automatically disconnect when the tractor and trailer are separated from their close coupled condition.

What is claimed is:

1. In a trucking structure,
    a tractor including a tractor frame and a tractor drive axle means supporting the tractor frame near the rear end thereof,
    a trailer comprising container means and a trailer suspension unit fixed to the rear end portion of the container means and including frame means and wheeled rear axle means,
    said trailer suspension unit providing a rear load bearing zone,
    releasable rear interlocking means fixed to the tractor frame and trailer for interlocking the rear end portion of the tractor frame and the trailer to prevent sidewise movement of the trailer relative to the tractor frame,
    load bearing structure between the rear tractor frame and trailer to provide a second and intermediate load bearing zone,
    and releasable front coupling means on the tractor frame and the front end of the trailer for holding the front end of the trailer against movement either vertically or horizontally relative to the tractor frame and to provide a forward and third load bearing zone.

2. The trucking structure of claim 1 wherein the rear interlocking means includes guideway means on the trailer bracketing the rear end portion of the tractor frame.

3. The trucking structure of claim 2 wherein the guideway means is of inverted U-shape.

4. The trucking structure of claim 2 including means for limiting upward movement of the intermediate portion of the trailer relative to the rear end portion of the tractor frame.

5. The trucking structure of claim 4 wherein the last named means comprises a horizontal pin on the trailer frame means and a socket in the rear end of the tractor frame.

6. The trucking structure of claim 1 wherein the front coupling means comprises a kingpin carried by the trailer and a coupler device on the the tractor frame adapted to interlock with the kingpin.

7. The trucking structure of claim 6 wherein the coupler device comprises a fifth wheel unit, means mounting the fifth wheel slidably between a rear position at the rear end portion of the tractor frame and a front position at the front end portion of the tractor frame, and means for locking the fifth wheel unit in either of said positions.

8. The trucking structure of claim 1 wherein the rear interlocking means comprises socket means on the trailer frame means adapted to receive and interlock with the rear end portion of the tractor frame.

9. In a truck combination,
a tractor having a frame, front steering axle means and floating rear drive axle means spaced a predetermined distance from the front steering axle means,
trailer means extending over the frame, secured to the frame at the front end portion of the trailer means, and resting on the rear end portion of the frame and secured thereto against sidewise movement, and also including trailer axle means supporting the rear end portion of the trailer means,
the trailer axle means being spaced to the rear of the drive axle means a second distance of not substantially greater than 41 percent of the overall distance between the trailer axle means and the steering axle means and not substantially less than 31 percent of said overall distance.

10. The truck combination of claim 9 wherein said second distance is about 36 percent of said overall distance.

11. The truck combination of claim 9 including air bag means operatively connected to the rear drive axle means and said tractor frame,
means for varying the pressure in the air bags to vary load distribution on the axle means.

* * * * *

UNITED STATES PATENT OFFICE
CERTIFICATE OF CORRECTION

Patent No. 3,718,346          Dated February 27, 1973

Inventor(s) KENNETH W. SELF: NORMAN B. CHEW: BILL I. TWYMAN

It is certified that error appears in the above-identified patent and that said Letters Patent are hereby corrected as shown below:

Column 2, line 43, "of" should be --or--

Column 5, line 53, "slip-on- should be --clip-on--

Column 6, line 45, after "rear" insert --end portion of the--

Column 7, line 3, omit one "the" before --tractor frame--

In the cited references:  Gouirand should be --9/63--

Signed and sealed this 3rd day of July 1973.

(SEAL)
Attest:

EDWARD M. FLETCHER, JR.          Rene Tegtmeyer
Attesting Officer                Acting Commissioner of Patents